Aug. 25, 1959 J. F. CUSS 2,900,697
FASTENERS FOR PANELS AND THE LIKE
Filed April 5, 1955 3 Sheets-Sheet 1

Inventor
John Freeman Cuss
By
Attorney

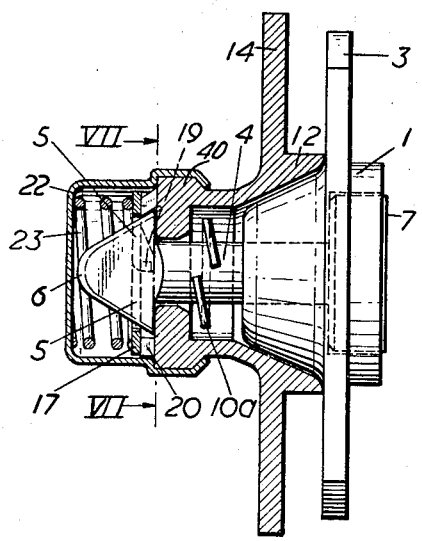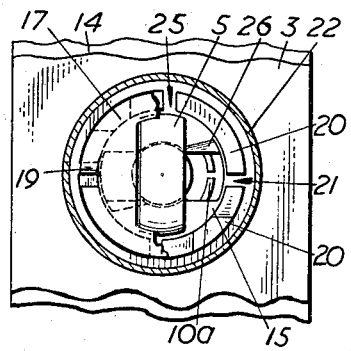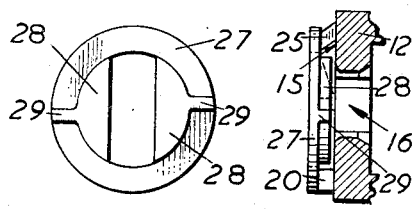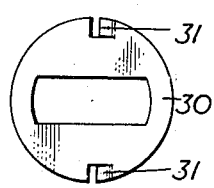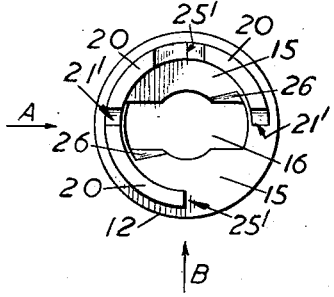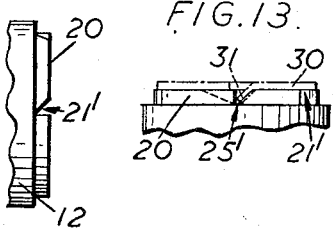

Aug. 25, 1959 J. F. CUSS 2,900,697
FASTENERS FOR PANELS AND THE LIKE
Filed April 5, 1955 3 Sheets-Sheet 3
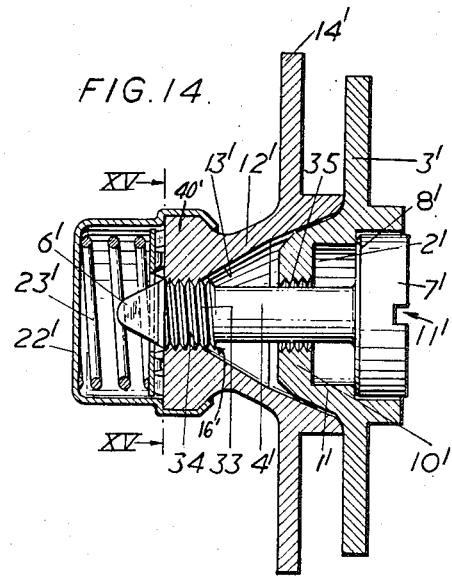
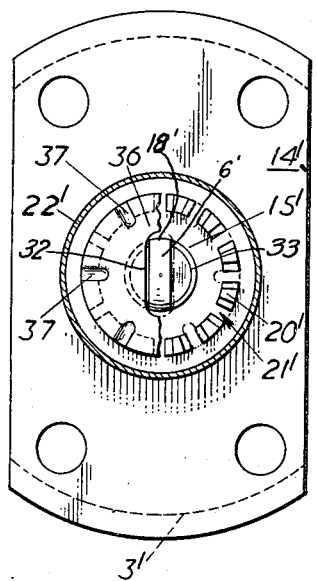
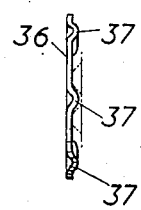
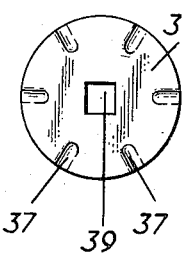
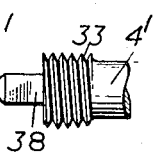
Inventor
John Freeman Cuss
By Lucke + Lucke
Attorney

United States Patent Office 2,900,697
Patented Aug. 25, 1959

2,900,697

FASTENERS FOR PANELS AND THE LIKE

John Freeman Cuss, Cheltenham, England

Application April 5, 1955, Serial No. 499,469

13 Claims. (Cl. 24—221)

This invention relates to fasteners for securing panels, cowlings, covers, doors and the like (all hereinafter generically referred to as "panels") to other structures and particularly to stress-bearing structures such as the stress-carrying portions of aircraft, in which the said panels are also subjected to stresses.

The invention is particularly concerned with fasteners of the spigot and socket type, which comprise a spigot adapted to be carried by a panel and a socket adapted to be carried by the structure to which the panel is to be secured and to receive and retain the said spigot.

An object of the present invention is to provide a spigot and socket fastener in which the spigot may be readily engaged in the said socket, the spigot, when so engaged, being held substantially immovable in its axial direction. A further object of the invention is to provide a spigot and socket fastener which may be used for securing stress-carrying panels of curved form to stress-bearing structure, the fasteners being capable of withstanding transverse or shearing loads.

According to the present invention I provide a fastener comprising separable mating parts including a socket and a spigot engageable therewith, said spigot being adapted to be introduced into said socket to engage a bearing surface therein which prevents further introduction of the spigot into the socket, and comprising a fastening pin extending axially thereof and adapted to enter an aperture in said socket to secure the spigot therein in engagement with said bearing surface, securing of said fastening pin in said aperture being effected by at least partial rotation of the fastening pin to a locked position thereof, and locking means comprising a detent member carried by said socket and adapted to be engaged by the fastening pin upon introduction of the spigot into the socket so that subsequent rotation of the fastening pin to its said locked position displaces said detent member to a position in which it resiliently retains the fastening pin against rotation from its locked position.

The said fastening pin may be furnished with a shoulder adapted, when the spigot is introduced into the socket, to pass through the said aperture in the socket to align with a locking surface on the said socket extending radially of the fastening pin so that rotation of the latter to the said locked position will engage said shoulder with said locking surface to prevent withdrawal of the spigot from the socket.

Alternatively, however, and particularly in cases where the fastener is to be used in situations in which considerable force must be exerted axially of the two parts of the fastener fully to introduce the spigot into the socket, the fastening pin may be furnished with a screw-threaded portion adapted to screw into a corresponding screw-thread in the said socket aperture.

The said detent member may conveniently comprise a disc-like washer rotatably carried by the socket and having an aperture aligned with the said socket aperture so that when the said spigot is introduced into the socket, the said fastening pin may pass through the washer aperture, the latter being formed to engage the fastening pin whereby the washer rotates therewith when such pin is moved to its locked position; co-operating catch and notch means of any convenient form on the washer and the socket may serve to retain the washer resiliently in the position thereof corresponding to the locked position of the fastening pin.

Thus the washer may be furnished with a tongue or similar projection extending out of the plane of the washer and adapted to engage in a notch in the socket when the washer has been rotated with the fastening pin to the locked position of the latter, or alternatively the socket may carry a tongue or similar projection adapted to enter a notch in said washer when the latter has been rotated with the fastening pin to the locked position of the latter. In either case the said tongue or projection may be inherently resilient so that it may be sprung out of said notch upon forcible or deliberate rotation of the fastening pin to its initial or unlocked position prior to withdrawal of the said spigot from the said socket, or the tongue or projection may be rigid or substantially rigid and the washer be urged resiliently towards the notch or the tongue or projection, as the case may be.

The said fastening pin may be axially immovable in the said spigot and merely free for rotation with respect thereto, or the fastening pin may be axially movable in the spigot so that it can be withdrawn at least partially from said socket aperture prior to withdrawal of the spigot from the socket; in the latter case the fastening pin will have only limited axial movement with respect to the spigot, the arrangement being such that when the spigot has been introduced into the socket and the fastening pin rotated to its locked position, the spigot will be held positively in engagement with the said bearing surface in the socket so that axial relative movement between the spigot and the socket cannot occur.

Conveniently the said spigot and socket may comprise complementary male and female cones respectively, the conical surface of the socket constituting the said bearing surface thereof which, by engagement with the complementary surface of the spigot, limits the introduction of the spigot into the socket. In any case, the spigot and socket are preferably so arranged that when the spigot is fully introduced into the socket, these parts co-operate to prevent lateral displacement of the spigot in the socket; with such an arrangement the fasteners can support transverse or shearing loads.

The fasteners of this invention may be adapted for securing curved panels to stress-bearing structure in such a manner that the axes of any pair of fasteners so used will be inclined; for this purpose the fasteners may incorporate the features described in the specification of my co-pending application Serial No. 400,259, viz. the spigots and the sockets may be so formed that an imaginary conical envelope embracing the spigot of such a fastener, when disengaged from the socket, lies wholly within an imaginary conical envelope having a cone angle not less than the cone angle of an imaginary conical envelope defined by the entrance to the socket.

Further features of the fasteners of this invention will appear from the following description of some embodiments of the invention which are illustrated by way of example, in the accompanying drawings, in which:

Figure 6 is a part-sectional side elevation of the interengaged socket and spigot of Figures 1 and 2 with the fastening pin in locked position;

Figure 7 is a fragmentary section on the line VII—VII of Figure 6, with part of the detent member broken away;

Figure 8 is a front view of an alternative form of detent member for the embodiment of Figures 1 to 7;

Figure 9 is a fragmentary part-sectional side elevation of the rear end of the body of a fastener socket embodying the detent member of Figure 8;

Figure 10 is a rear view of yet another alternative form of detent member for the embodiment of Figures 1 to 7;

Figure 11 is a fragmentary rear elevation of a socket body adapted for use with the detent member of Figure 10;

Figure 12 is a fragmentary side elevation of the rear end of the socket body of Figure 11, as seen in the direction of arrow A in Figure 11;

Figure 13 is a fragmentary side elevation of the rear end of the socket body of Figure 11, as seen in the direction of arrow B in Figure 11 and showing the detent member of Figure 10 in position on said body;

Figure 14 is a part-sectional side elevation of a second embodiment of fastener in accordance with this invention with the pin in locked position;

Figure 15 is a section on the line XV—XV of Figure 14, part of the detent member being broken away;

Figure 16 is a side elevation of the detent member of the fastener of Figures 14 and 15;

Figure 17 is a fragmentary side elevation of a modified form of fastening pin for the fastener of Figures 14 and 15; and Figure 18 is a rear view of the modified detent member employed in a fastener embodying the fastening pin of Figure 17.

Figure 1:
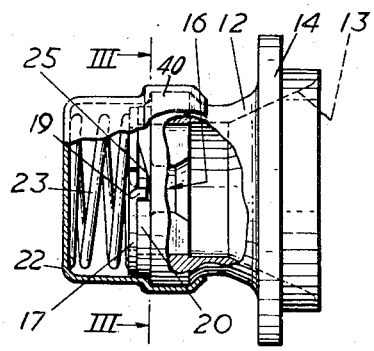
Figure 1 is a side elevation of the socket of one embodiment of this invention, part of the socket being broken away to reveal the internal construction.

A fastener constructed in accordance with one embodiment of this invention is illustrated in Figures 1 to 7 and comprises (Figure 2) a spigot 1 in the form of a male cone having an axial bore 2 and a mounting plate 3 integrally formed with the base of such cone so as to extend as a radial flange from the periphery of the cone near the base thereof, said mounting plate being furnished with suitable means for securing it to, for example, a panel which is to be detachably secured to a stress-bearing structure.

A fastening pin 4 is located axially in the bore 2 of the spigot 1 and projects beyond the apex of the cone, being furnished at its tip with a pair of diametrically opposed radial lugs 5 which constitute shoulders for engagement with a locking surface on the socket subsequently described. The said lugs 5 have a width less than the diameter of that part of the fastening pin 4 from which they project and the tip of the fastening pin has a spherical surface 6 which merges with the peripheral surface of each of the lugs 5 so that the end of the pin has substantially the form of an arrow head with a spherical tip.

The fastening pin 4 is furnished with a head 7 of larger diameter than the pin and bears against a step 8 in the bore 2 of the spigot cone so that movement of the fastening pin axially through the spigot is positively limited in the direction of the tip of the fastening pin. The fastening pin 4 is resiliently urged in the opposite direction by means of a helical spring 9 which surrounds the fastening pin and is trapped between the head 7 of the latter and an inwardly directed flange 10 within the bore 2 of the spigot cone.

Figure 2:
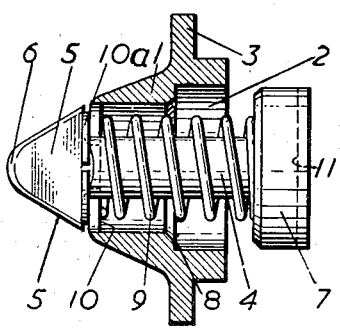
Figure 2 is a part-sectional side elevation of the spigot for the embodiment of which the socket is shown in Figure 1.
Figure 3:
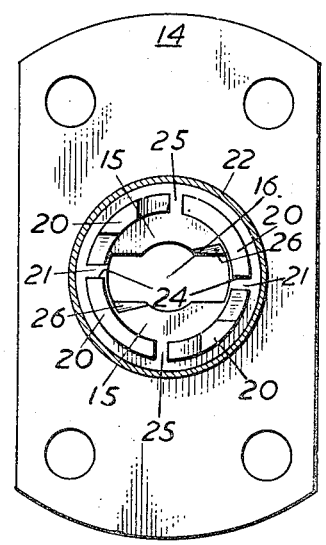
Figure 3 is a section on the line III—III of Figure 1, with the detent member omitted.
Figure 4:
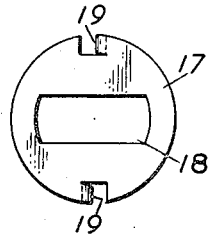
Figure 4 is a rear view of the detent member of the socket of Figure 1.
Figure 5:
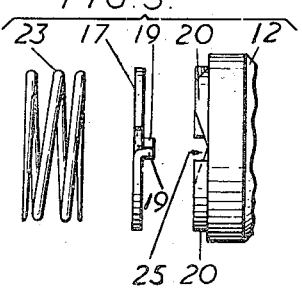
Figure 5 is a fragmentary exploded view of the rear of the body, the detent member and spring of the socket of Figure 1.

The flange 10 is provided with diametrical slots through which the lugs 5 of the pin 4 may pass during assembly of the spigot (the pin 4 being introduced from the front or right-hand end as seen in Figure 2) and a split retaining ring 10a is arranged on the pin to prevent inadvertent disassembly of the spigot.

Thus the fastening pin 4 has limited axial movement within the spigot cone bore 2 and is urged by the spring 9 to a position in which the said shoulders formed by the lugs 5 of the pin trap the ring 10a against the end surface of the spigot cone. The head 7 of the fastening pin is furnished with a kerf 11 or the like for engagement with a suitable tool, e.g. a screw-driver, by means of which the fastening pin can be rotated relatively to the spigot into and out of its locked position, as hereinafter explained.

The fastener also comprises a socket (Figures 1 and 3) adapted to receive and retain the said spigot 1, this socket comprising a body 12 having a female conical surface 13 complementary to the spigot cone so that the latter may be introduced into the socket until the conical surfaces of the two parts interengage to prevent further introduction of the spigot into the socket.

The socket is furnished, like the spigot, with a mounting plate 14 comprising a radial flange by means of which the socket may be secured to a stress-bearing structure to which a panel carrying the said spigot is to be detachably secured.

The outer surface of the socket body 12 is generally cylindrical and is provided with a collar portion 40 at its rear end, i.e. the end of the socket adjacent to the apex of the conical surface 13 thereof. The collar portion has a radial surface 15 surrounding an axial aperture 16 which communicates with the conical bore of the socket and is dimensioned to receive the fastening pin 4; this radial surface 15, which constitutes the locking surface of the socket, is slotted to enable the lugs 5 of the fastening pin 4 to pass from the bore of the socket to behind the locking surface.

The locking surface 15 is so spaced from the entrance to the socket that when the spigot 1 is fully introduced into the socket and the fastening pin 4 moved until its head engages the step 8 in the spigot bore 2, the shoulders constituted by the fastening pin lugs 5 are aligned with the locking surface 15. When the fastening pin 4 has been urged into this position, rotation of the pin through 90° or thereabouts will engage the shoulders of the pin with the locking surface 15 and thus prevent withdrawal of the spigot from the socket and also hold the spigot in the socket so that it is axially immovable with respect thereto; since the cone of the spigot is engaged with the complementary conical surface 13 of the socket, the spigot will also be laterally immovable within the socket.

The aforesaid position of the fastening pin, with its shoulders engaged with the said locking surface of the socket, is shown in Figures 6 and 7 and is referred to herein as the "locked" position and whilst there is no tendency for the fastening pin to rotate until its lugs align with the said slots in the locking surface, it is nevertheless desirable, particularly where the fastener is likely to encounter vibration or varying stresses, as in aircraft applications, to provide means for retaining the fastening pin in its locked position until forcibly or deliberately rotated therefrom prior to withdrawing the spigot from the socket.

For this purpose, the socket is provided with a detent member which in this embodiment comprises a disc-like washer 17 (Figure 4) which rides on and behind the locking surface 15 of the socket collar portion 40. The washer 17 has a central aperture comprising a diametrical slot 18 corresponding to the slots in the locking surface 15 so that the tip 6 and lugs 5 of the fastening pin 4 may pass through such slot, the fastening pin lugs mating with the slot 18 so that when the fastening pin is rotated to its said locked position, the washer 17 is rotated therewith.

The washer 17 is furnished, in this embodiment, with a pair of diametrically opposed tongues 19 which project out of the plane of the washer and towards the locking surface 15 of the socket; the latter is provided with an annular rib 20 which has a pair of diametrically opposed locking notches 21 in which the tongues 19 are received when the washer 17 has been turned with the fastening pin 4 to the locked position of the latter.

The washer 17 is retained on the rib 20 of the locking surface 15 of the socket by means of a cap 22 fitted over and secured to the rear end of the socket body, the rear end of said cap being spaced from the rear surface of the washer 17; a helical spring 23 (or alternatively a rubber or like resilient ring) is interposed between the end of the cap 22 and the rear surface of the washer 17 resiliently to urge the washer against the rib 20.

Desirably, and as shown, the locking notches 21 have a saw-tooth form so that rotation of the fastening pin 4 beyond the locked position is prevented by abutment between the washer tongues and one wall 24 of the locking notches.

In order to ensure that the washer 17 is held with its slot 18 aligned with the slots in the locking surface 15 when the fastening pin and spigot are withdrawn from the socket, the rib 20 of the locking surface 15 is, as shown, desirably provided with a pair of diametrical grooves 25 so located as to receive the washer tongues 19 when the aforesaid alignment is achieved, whereby the washer 17 will be resiliently located in the appropriate alignment when the spigot is withdrawn from the socket. The grooves 25 have a saw-tooth formation, as shown, so that the washer 17 (and hence the fastening pin 4 when engaged therewith) may only rotate through 90° or thereabouts.

Since the above-described fastener is primarily adapted for securing stress-carrying panels to stress-bearing structure, it will often be necessary, upon introducing the spigot into the socket, to apply considerable stress to the panel carrying the spigot and this may involve difficulty in fully introducing the spigot into the socket. In order to facilitate the full introduction of the spigot into the socket, the locking surface 15 of the socket is chamfered or bevelled as shown at 26 (Figures 3 and 7) adjacent the diametrical slots therein so that the shoulders of the fastening pin 4 may engage these chamfered or bevelled surfaces 26 upon initial rotation of the fastening pin 4 towards its locked position with the result that the said shoulders will ride up the surfaces 26 and thus draw the spigot forcibly home into the socket.

In order to enable the above-described fastener to be employed for the securing of curved panels to stress-bearing structure, the spigot of the fastener may have a greater cone angle than that of the socket surface 13 and the fastening pin 4 have its lugs 5 and tip 6 so dimensioned that when the shoulders of the pin trap the retaining ring 10a against the end of the spigot cone (i.e. when the fastening pin is fully retracted), the tip and lugs of the fastening pin lie wholly within the imaginary conical envelope of the spigot cone surface.

The above-described fastener may be modified in several ways to constitute further embodiments of this invention. Thus for example, as shown in Figures 8 and 9, the detent member may comprise a cast metal disc 27 having a diametrically slotted central boss 28 adapted to locate the disc axially by seating within the rib 20 of the locking surface 15 of the socket; the disc 27 is furnished with a pair of lugs 29 which perform the same function as the tongues 19 of the disc 17 in the embodiment of Figures 1 to 7. This form of detent member would usually be employed in small size fasteners where space limitations preclude use of the disc 17 of Figure 4 without serious loss of rigidity which would result in an ineffective locking action.

Alternatively the washer 17 may have but a single tongue 19 adapted to engage in a single locking notch 21 in the rib 20 of the locking surface 15 when the washer has been rotated with the fastening pin to the locked position of the latter, the rib 20 having a single groove 25 to receive the tongue 19 when the diametrical slot 18 in the washer 17 is aligned with the slots in the locking surface 15.

Yet another alternative form of detent member is illustrated in Figures 10 to 13. Thus as shown in Figure 10, the detent member comprises a washer 30 similar in form to the washer 17 of the embodiment of Figures 1 to 7 but having a pair of tongues 31 which are as object and mirror image with respect to the plane containing the axis of the slot in the washer. With such a detent member, the notches and grooves in the rib 20 on the locking surface have to be appropriately modified as shown at 21' and 25' in Figures 11, 12 and 13, and it will be apparent that with such an arrangement it is only possible to rotate the washer through 90° and it is impossible to over-ride the grooves 25' in rotating the washer from its locked to its unlocked position.

Where the fasteners of this invention are to be used in situations in which a heavy axial load is to be carried by the fasteners, which as for example when the fasteners are used for securing large stress-carrying curved panels to stress-bearing structure and the securing of such panels in place involves distortion of the panel and/or the structure, it may often be difficult to introduce the fastener spigots into their sockets, even when the locking surfaces 15 of the sockets are bevelled or chamfered as above described.

For such applications the fasteners of this invention may be modified by providing the fastening pins thereof with a screw-threaded portion in place of said shoulders 5, adapted to engage the radial surface 15 surrounding the axial aperture 16 when being screwed into a corresponding screw thread in the said axial socket aperture 16. With such an arrangement the spigots of the fasteners can be drawn fully home, i.e. to the forward extended limit with the tip or extension of the pin bearing against locking surface 15 by rotation of the fastening pins with a screw-driver or similar tool.

The screw-threaded fastening pin of such a fastener must, of course, be capable of co-operating with the locking means of the socket and to this end the fastening pin is furnished with a non-circular extension beyond its screw-threaded portion, such extension serving to engage the locking means. Thus, where the locking means are in the form of a washer, as in the embodiment of Figures 1 to 7, the latter may be furnished with a non-circular aperture aligned with the socket aperture and adapted to mate with the extension of the fastening pin; the aperture in the washer may be in the form of a slot or square hole and the fastening pin have an extension having a cross-section suitable for engagement with such slot or square hole of the washer. It will, of course, be apparent that the locking means must be capable of rotation in either direction with the fastening pin to permit unscrewing of the latter from the socket aperture, as well as locking it against rotation relative to its engagement with the radial surface 15 surrounding the axial aperture 16.

An embodiment of the invention incorporating a screw-threaded fastening pin is illustrated in Figures 14, 15 and 16. In these figures, parts corresponding to their equivalents in the embodiment of Figures 1 to 7 have been given similar, but primed, references and will not be further described.

It will be noted that the fastening pin 4' is furnished with a spherical tip 6' which is formed with a flat parallel extension 32 but does not have lugs equivalent in length to the lugs or shoulders 5 of the embodiment of Figures 1 to 7; instead, the shank of the pin 4' behind the flat extension 32 is screw-threaded to form a securing means 33 and is adapted to screw into corresponding screw threads 34 in the collar portion 40' of the socket 12' terminating in the axial aperture or bore 16' in the radial surface 15'. The flange 10' of the spigot body 1' is also provided with a screw-threaded bore 35 through which threads 33 of the pin 4' are screwed upon assembly of the spigot.

As clearly shown in Figure 15, the rear end of the socket 12' is provided with a locking surface 15' which carries an annular rib 20' interrupted at equiangularly-spaced locations by locking notches 21'; twelve of these notches 21' are employed in the illustrated arrangement but a larger or smaller number may be employed.

A detent member in the form of a diametrically slotted washer 36 having a radial slot 18' for mating engagement with extension 32 is pressed against the locking surface rib 20' by means of the spring 23'. This washer 36 has six equiangularly-spaced radial depressions 37 at its periphery which seat in the locking notches 21' resiliently to retain the washer, and hence the fastening pin 4' when in locking engagement therewith, in any one of twelve rotational positions with respect to the socket 12'.

A modification of the embodiment of Figures 14, 15 and 16 is illustrated in Figures 17 and 18. In this modification, the fastening pin 4' has a spherical tip 6' between which and the screw-threaded portion 33 is formed a square-section extension 38; the detent member 36 is formed, as shown in Figure 18, with a square aperture 39 in place of the diametrical slot in the corresponding washer of the embodiment of Figures 14, 15 and 16.

The forms of the invention here described and illustrated are presented merely as examples of how the invention may be embodied and applied. Other forms, embodiments and applications of the invention, coming within the proper scope of the appended claims, will, of course suggest themselves to those skilled in the art.

I claim:

1. A fastener comprising separable mating parts including a spigot and a socket dimensioned to receive such spigot; a female conical bearing surface in said socket located to engage with a complementary male conical surface on said spigot to limit introduction of the spigot into the socket; an apertured locking surface at the rear of said socket; an apertured washer riding on said locking surface; a fastening pin carried by and extending axially of said spigot to pass through the aperture in said locking surface and into the aperture of said washer when the spigot is introduced into the front of said socket and engaged with the bearing surface therein, securing means on said fastening pin located to cooperate with said locking surface when the spigot is engaged with the bearing surface of the said socket, rotation of the fastening pin relatively to the socket to a locked position rotating the washer and engaging said securing means with said locking surface to secure the fastening pin in the socket; and co-operating catch and notch means on said washer and locking surface for resiliently retaining the washer in the position thereof corresponding to the said locked position of the fastening pin.

2. A fastener comprising separable mating parts including a spigot and a socket dimensioned to receive such spigot; a female conical bearing surface in said socket located to engage with a complementary male conical surface on said spigot to limit introduction of the spigot into the socket; an apertured locking surface at the rear of said socket; an apertured washer riding on said locking surface; a fastening pin carried by and extending axially of said spigot to pass through the aperture in said locking surface and into the aperture of said washer when the spigot is introduced into the front of said socket and engaged with the bearing surface therein; a shoulder on said fastening pin located to align with said locking surface when the spigot is engaged with the bearing surface of the said socket, partial rotation of the fastening pin relatively to the socket to a locked position rotating said washer and engaging said shoulder with said locking surface to secure the fastening pin in the socket; and co-operating catch and notch means on said washer and socket for resiliently retaining the washer in the position thereof corresponding to the said locked position of the fastening pin.

3. The fastener of claim 2, including means resiliently urging said washer towards said locking surface, said catch and notch means comprising a projection extending out of the plane of the washer towards said locking surface and a locking notch in said locking surface to receive said projection when the washer is in the position thereof corresponding to the locked position of the fastening pin.

4. The fastener of claim 3, in which said locking notch has a saw-tooth form to receive said projection and to prevent movement thereof beyond the position corresponding to the locked position of the fastening pin.

5. The fastener of claim 4, including a groove in said locking surface located to receive said projection when the washer is in position for the spigot to be introduced into and withdrawn from the socket.

6. A fastener comprising separable mating parts including a spigot having a male conical surface and a socket dimensioned to receive such spigot; a female conical bearing surface in said socket located to engage with said male conical surface on said spigot to limit introduction of the spigot into the socket; a slotted locking surface at the rear of said socket; a slotted washer riding on said locking surface; a spring urging said washer towards said locking surface; a fastening pin carried by and extending axially of said spigot, having limited axial freedom therein; and including a cylindrical shank and a conical tip joining such shank in a radial shoulder and having parallel flats, said tip being dimensioned to pass through said locking surface slot and to engage said washer slot with said shoulder aligned with said locking surface when the fastening pin is in an extended limit position and said spigot is introduced into said socket and engaged with the bearing surface therein, partial rotation of said fastening pin to a locked position rotating said washer and engaging said shoulder with said locking surface to prevent withdrawal of the spigot from the socket; a tongue near the periphery of said washer and extending out of the plane of the latter towards said locking surface; and a locking notch in said locking surface to receive said tongue when the washer has been rotated with the fastening pin to the said locked position thereof.

7. A fastener comprising separable mating parts including a spigot having a male conical surface and a socket dimensioned to receive such spigot; a female conical bearing surface in said socket located to engage with said male conical surface of the spigot to limit introduction of the spigot into the socket; an apertured locking surface at the rear of said socket; a slotted washer riding on said locking surface; spring means resiliently urging said washer against said locking surface; a fastening pin carried by and extending axially of said spigot, having limited axial freedom therein, and including a tip with parallel flats to pass through the aperture in said locking surface and to engage the slot in the washer when said fastening pin is an extended limit position and the spigot is introduced into the front of said socket and engaged with the bearing surface therein, securing means on said fastening pin located to cooperate with said locking surface when the spigot is engaged with the bearing surface of the said socket, rotation of the fastening pin relatively to the socket to a locked position rotating said washer and engaging said securing means with said locking surface to secure such pin in the socket; a projection near the periphery of said washer and extending out of the plane thereof towards said locking surface; and a locking notch in said locking surface located to receive said projection when the washer has been rotated with the fastening pin to the said locked position of the latter.

8. A fastener comprising a male conical spigot and a complementary female conical socket to receive and retain said spigot against lateral displamecent; an apertured locking surface at the rear of said socket; a slotted washer riding on said locking surface; spring means resiliently urging said washer against said locking surface; a fastening pin having limited axial freedom in an axial bore in said spigot, such pin being rotatable in said bore and movable between a forward extended limit position and a withdrawn limit position and including a securing means comprising a tip with parallel flats dimensioned to pass through and located to cooperate with said locking surface aperture and to engage the slot in said washer when said spigot is introduced into the front of the socket and the fastening pin moved to its said extended limit position, at least partial rotation of the fastening pin relatively to the socket to a locked position rotating said washer and engaging said securing means with said locking surface to secure such pin in the socket to hold the spigot immovably in the socket; a projection near the periphery of said washer and extending out of the plane thereof towards said locking surface; and a locking notch in said locking surface located to receive said projection when the washer has been rotated with the fastening pin to the said locked position of the latter.

9. A fastener comprising a male conical spigot and a complementary female conical socket to receive and retain said spigot against lateral displacement; an apertured locking surface at the rear of said socket, the aperture in such surface comprising a pair of aligned slots linked by a circular bore on the axis of the socket; a slotted washer riding on said locking surface, the slot in said washer overlying said aligned slots in the locking surface; spring means resiliently urging said washer against said locking surface; a fastening pin having limited axial freedom in an axial bore in said spigot, such pin being rotatable in said bore and movable between a forward extended limit position and a withdrawn limit position and including a cylindrical shank and a conical tip joining such shank in a pair of aligned radial shoulders and having parallel flats, said shoulders and shank being dimensioned to pass through said locking surface aperture to bring said shoulders into alignment with such surface and said flats into engagement with said washer slot when the spigot is introduced into the front of said socket and the fatsening pin moved to its said extended limit position whereby subsequent partial rotation of said pin to a locked position rotates said washer and engages said shoulders with said locking surface to hold the spigot immovably in the socket; a tongue near the periphery of said washed and extending out of the plane of the latter towards said locking surface; and a locking notch in said locking surface to receive said tongue when the washer has been rotated with the fastening pin to the said locked position thereof.

10. A shear-bearing fastener comprising separable mating parts including a spigot and a socket dimensioned to receive said spigot, a female conical bearing surface in the front end of said socket located to engage with and limit introduction of a complementary male conical surface on said spigot, said socket terminating in a collar portion at the rear end thereof, a radial locking surface disposed on the rear end of said collar portion, a slotted washer riding on said locking surface, a fastening pin carried by said spigot having limited axial freedom therein and terminating in a flatsided extension, said extension adapted to pass through said collar portion and project beyond said locking surface to engage the slot in said washer when said spigot is inserted into the front end of said socket, said washer adapted to be rotated about said radial locking surface by said extension to a locked position thereon, catch means disposed on said washer, notch means disposed on said locking surface adapted to cooperate with said catch means to positively restrain rotation of said pin out of such locked position, said conical engaging surfaces serving to prevent lateral movement of said spigot relative to said socket when said pin is rotated to such locked position, and securing means carried by said pin directly engaging said collar portion when said conical surfaces are in such engagement to prevent said pin from axial displacement within said socket.

11. A fastener according to claim 10 wherein said securing means comprises screw threads disposed on said pin located to cooperate with screw threads disposed in said collar portion when said spigot and said socket are in mating engagement.

12. A fastener according to claim 11 wherein said locking surface is provided with a plurality of locking notches located to receive a projection disposed adjacent the periphery of said washer and extending out of the plane thereof towards said locking surface, said notches adapted to receive said projection at selected rotational positions of said washer, each of such positions corresponding to the said locked position of said fastening pin and means resiliently pressing said washer into engagement with said locking surface.

13. A fastener according to claim 12, wherein said socket female conical surface limits the introduction of said spigot male conical surface and wherein said catch and notch means comprises a plurality of equiangularly-spaced radial ribs disposed on said washer and a plurality of equiangularly-spaced radial locking notches disposed in said locking surface to receive said ribs and retain said washer against rotation from such locked positions.

References Cited in the file of this patent

UNITED STATES PATENTS

| | | |
|---|---|---|
| 544,507 | Gillette | Aug. 13, 1895 |
| 1,246,353 | Thigpen | Nov. 13, 1917 |
| 2,323,260 | Venditty | June 29, 1943 |
| 2,334,680 | Murphy | Nov. 16, 1943 |
| 2,335,828 | Herget | Nov. 30, 1943 |
| 2,378,122 | Barlow | June 12, 1945 |
| 2,382,973 | Cannova | Aug. 21, 1945 |
| 2,420,733 | Cannova | May 20, 1947 |
| 2,442,064 | Veit | May 25, 1948 |
| 2,479,992 | Woods | Aug. 23, 1949 |
| 2,763,908 | Marschner | Sept. 25, 1956 |

FOREIGN PATENTS

| | | |
|---|---|---|
| 564.108 | Great Britain | Sept. 13, 1944 |
| 626,013 | Great Britain | July 7, 1949 |
| 675,694 | Great Britain | July 16, 1952 |